United States Patent [19]
Lucian

[11] Patent Number: 6,018,466
[45] Date of Patent: Jan. 25, 2000

[54] ELECTRONIC SIGNAL CONDITIONER

[76] Inventor: Maria Lucian, 678 Martinique Pl., Newbury Park, Calif. 91320

[21] Appl. No.: 08/905,839

[22] Filed: Aug. 4, 1997

Related U.S. Application Data

[60] Provisional application No. 60/022,868, Jul. 30, 1996.

[51] Int. Cl.[7] .................................................. H02M 3/335
[52] U.S. Cl. .................................. 363/16; 363/8; 363/164
[58] Field of Search .............................. 363/8, 9, 10, 14, 363/15, 16, 17, 157, 159, 164, 165; 327/306, 355, 361

[56] References Cited

U.S. PATENT DOCUMENTS 4,591,963  5/1986  Retotar ........................................ 363/17

Primary Examiner—Y. J. Han
Attorney, Agent, or Firm—Albert O. Cota

[57] ABSTRACT

An electronic signal conditioner (ESC) (10) that can be designed to operate a differential capacitive load (90) or a single-ended capacitive load (92). The ESC (10) is disclosed in four design configurations. In the first design, the ESC (10) employs a pair of high-frequency transformers (34,48) each having a single-ended primary winding (36,50) that is connected through a secondary winding (42,56) to a rectifying circuit (70,80) that operates a differential capacitive load (90). The second design also employs a pair of transformers (32,34) that have push-pull primary windings (36, 50) which similarly operate a differential capacitive load (90). The third design employs a single transformer (34) having a single-ended primary winding (36) which similarly operates a single-ended capacitive load (92). The fourth design also uses a single transformer (32) having a push-pull primary winding (36) which operates a single-ended capacitive load (92).

4 Claims, 5 Drawing Sheets

ELECTRONIC SIGNAL CONDITIONER

This appln claims benefit of provisional appln 60/022,868 filed Jul. 31, 1996.

TECHNICAL FIELD

The invention pertains to the general field of electronic signal conditioners and more particularly to a signal conditioner that can be designed to operate a differential or single-ended capacitive load.

BACKGROUND ART

Electronic signal conditioners (ESC) are designed to optimally condition an output signal that is to operate a particular type of load. One of the basic problems associated with ESC's, especially those that operate a differential or single-ended capacitive load, is the load factor provided to the ESC. The ideal load connected to the ESC is one of constant magnitude and steady duration. However, in practical situations a load typically varies with respect to power and time.

To allow an ESC to follow the excursions of a variable load it is necessary that the impedance applied to the load by the ESC be the image impedance of the load. The adjustment of an ESC to provide this condition is called load matching. The ESC disclosed herein is designed to be adjustably set to optimally fit various differential and single-ended capacitive loads such as are found in various types of capacitive transducers.

A search of the prior art did not disclose any patents or literature that read directly on the claims of the instant invention.

DISCLOSURE OF THE INVENTION

The electronic signal conditioner is amenable for being designed to control either a single-ended differential capacitive load, a push-pull differential capacitive load, a single-ended capacitive load or a push-pull single-ended capacitive load. In its most basic design configuration the electronic signal conditioner is comprised of the following elements:

a) an external power supply having means for supplying the required power levels to the electronic signal conditioner, b) at least one mixer circuit having means for receiving an a-c input signal and a d-c voltage. The at least one mixer circuit adds the a-c signal to the d-c voltage to produce at least one mixed signal, c) a pulse generator circuit having means for producing at least one phase modulating signal, d) at least one power modulator circuit having means for receiving the at least one mixed signal and d-c voltage and the at least one phase modulating signal. The power modulator circuit produces at least one high-frequency signal having an amplitude proportional to the at least one mixed signal and d-c voltage and a phase corresponding to the at least one phase modulating signal, and e) at least one high-frequency transformer having a primary winding and a secondary winding. To at least one of the ends of the primary winding is connected the at least one high-frequency signal, and from the second winding is produced a voltage having an amplitude which corresponds to the requirement of the capacitive load. Across the secondary winding is connected a rectifying circuit having an output load signal which is connected the capacitive load.

Although the electronic signal conditioner can function with the above elements it is preferred that the electronic signal conditioner be operated with the following additional circuits:

a) a frequency correction circuit having means for receiving an input signal and producing at least one a-c signal which compensates for the frequency and power non-linearities of the capacitive load. When this circuit is added, the at least one a-c signal functions as the input signal which is applied to the at least one mixer circuit, and b) a d-c adjust circuit having means for producing at least one adjustable d-c voltage that is commensurate with the specific load characteristics of the capacitive load. When this circuit is added, the adjustable d-c voltage functions as the d-c voltage applied to the at least one mixer circuit.

In view of the above disclosure, it is the primary object of the invention to provide a high efficiency, low distortion electronic signal conditioner that can be designed to operate with various configurations of capacitive loads.

In addition to its primary object, is is also an object of the invention to produce an electronics signal conditioner that:

can be used to drive various capacitive loads such as electrostatic sound transducers, utilizes low voltage signal processing, is based on currently available solid state technology, except for voltage rectification, no electronic signal processing is required in and after the secondary of the transformers, can be operated in a push-pull mode which allows the amplitude of the signal in the primary of an output transformer to be doubled, has a high reliability and is relatively maintenance free, and is cost effective from both manufacturing and consumer points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
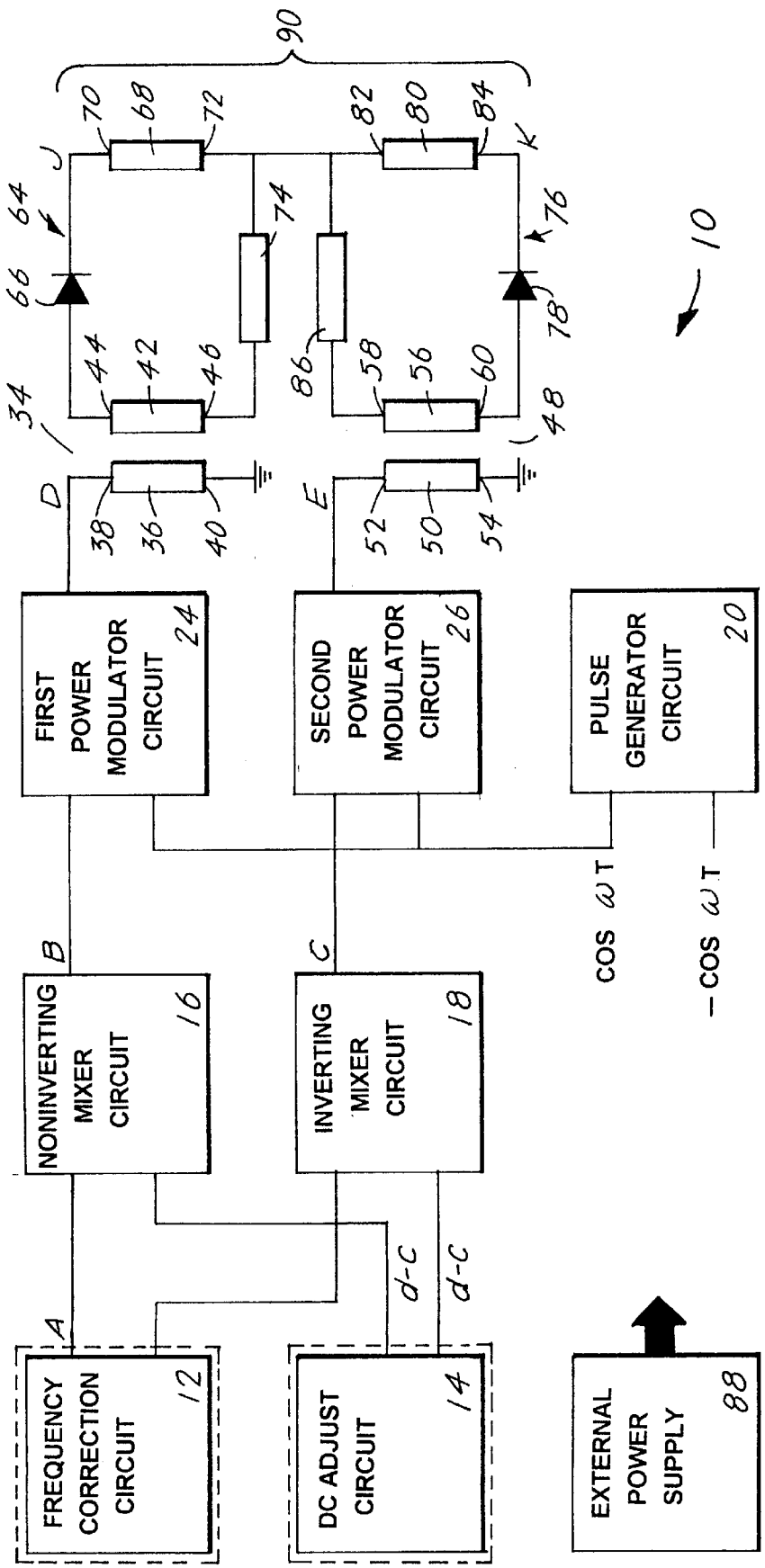
FIG. 1 is a block diagram of an electronic signal conditioner that operates a differential capacitive load by utilizing two transformers having single-ended primary windings.

The best mode for carrying out the invention is presented in terms of a preferred embodiment that is disclosed in four design configurations. Two of the configurations allow the electronic signal conditioner to operate a differential capacitive load and the other two to operate a single-ended capacitive load.

The preferred embodiment of the electronic signal conditioner (ESC) 10, as shown in FIGS. 1–5, is comprised of the following major elements: a frequency correction circuit 12, a d-c adjust circuit 14, a noninverting mixer circuit 16, an inverting mixer circuit 18, a pulse generating circuit 20, a first power modulator circuit 24, a second power modulator circuit 26, a third power modulator circuit 28, a fourth power modulator circuit 30, a first high-frequency transformer 34, a second high-frequency transformer 48, a first rectifying circuit 64, a second rectifying circuit 76, a first current limiting impedance 74, a second current limiting impedance 86 and an external power supply 88.

The first of the four design configurations of the ESC 10, as shown in FIG. 1, operates a differential capacitive load 90.

The ESC 10 commences operating when a low-frequency input signal is applied to the input of the frequency correction circuit 12. This circuit has means for causing the low-frequency input signal to be changed to compensate for the frequency and power nonlinearities of the differential capacitive load 90. The output of the frequency correction circuit 12 is a first a-c signal and a second a-c signal both of which are shown in FIG. 5A. The frequency correction circuit is also designed to be programmed by either a digital or an analog means.

The frequency correction circuit functions in combination with the d-c adjust circuit 14 which can also be programmed by either a digital or an analog means. The d-c adjust circuit 14, as also shown in FIG. 1, has means for producing and adjusting the amplitude of a first d-c voltage and a second d-c voltage which are utilized as a d-c bias voltage.

The outputs of the frequency correction circuit 12 and the d-c adjust circuit 14 are applied to the noninverting mixer circuit 16 and the inverting mixer circuit 18 as also shown in FIG. 1.

The noninverting mixer circuit 16 has means for receiving the first a-c signal from the circuit 12 and the first d-c voltage from the circuit 14. The noninverting mixer circuit 16 is designed to add the first a-c signal to the first d-c voltage to produce a first mixed signal as shown in FIG. 5B.

The inverting mixer circuit 18 has means for receiving the second a-c signal and the second d-c voltage. The inverting mixer circuit 18 is designed to add the second a-c signal to the second d-c voltage to produce an inverted second mixed signal as shown in FIG. 5C.

In this first design configuration, a first power modulator 24 and a second power modulator 26 are used. The two power modulators are controlled by the mixer circuits 16,18 and the pulse generator circuit 20. The circuit 20 has means for producing a direct phase modulating signal COS ωt and a complementary phase modulating signal –COS ωt. However, in the first design, only the direct phase modulating signal COS ωt is utilized.

The first power modulator 24 has means for receiving the first mixed signal from the noninverting mixer circuit 16 and the phase modulating signal COS ωt from the pulse generator circuit 20. The output of the first power modulator 24 is a first high-frequency signal, as shown in FIG. 5D, which has an amplitude proportional to the first mixed signal and a phase corresponding to the phase modulating signal COS ωt.

To the second power modulator circuit 26 is applied the inverted, second mixed signal and d-c voltage and the direct phase modulating signal COS ωt. The output of the second modulator circuit 26 is a second high-frequency signal, as shown in FIG. 5E, which has an amplitude proportional to the second mixed signal and a phase corresponding to the phase modulating signal COS ωt.

The first design configuration is operated with a first high-frequency transformer 34 and a second high-frequency transformer 48.

The first high-frequency transformer 34 has a single-ended primary winding 36 having a first end 38 and a second end 40. The second end 40 is connected to circuit ground and the first end 38 is connected to the first high-frequency signal from the first power modulator 24. The secondary winding 42 has a first end 44 and a second end 46. From the secondary winding 42 is produced a voltage having an amplitude which corresponds to the requirements of the differential capacitive load 90.

The second high-frequency transformer 48 also has a single-ended primary winding 50 having a first end 52 and a second end 54. The second end is connected to circuit ground and the first end 52 is connected to the second high-frequency signal from the second power modulator 26. The secondary winding 56 has a first end 58 and a second end 60. The output from the secondary winding 56 is a voltage having an amplitude which also corresponds to the requirements of the differential capacitive load 90.

In series with the secondary winding 42 of the first high-frequency transformer 34 is connected a first rectifying circuit 64 and in series with the secondary winding 56 of the second high-frequency transformer 48 is connected the second rectifying circuit 76.

The first rectifying circuit 64 includes a diode 66 having an anode connected to the first end 44 of the secondary winding 42 of the first high-frequency transformer 34. The cathode of the diode 66 is connected to a first side 70 of a first load 68 which also has a second side 72. The second side 72 of the load, is connected through a first current limiting impedance 74 to the second end 46 of the secondary winding 42. The first rectifying circuit produces an output load signal, as shown in FIG. 5J, that is applied to the first load 68.

The second rectifying circuit 76 consists of a second diode 78 having an anode connected to the second end 60 of the secondary winding 56 of the second high-frequency transformer 48. The cathode of the diode 78 is connected to the second side 84 of a second load 80. The second load 80 has a first side 82 that is connected through a second current limiting impedance 86 to the first end 58 of the secondary winding 56. The second rectifying circuit 76 produces an output load signal, as shown in FIG. 5K, that is applied to the second load 80. As shown in FIG. 1, the second side 72 of the first load 68 and the first side 82 of the second load 80 are connected together. From across the first side 70 of the first load 68 and the second side 84 of the second load 80 is connected the differential capacitive load 90.

The external power supply 88, as shown in FIGS. 1–4, is designed to supply the required power levels to all the circuits comprising the electronic signal conditioner 10.

Figure 2:
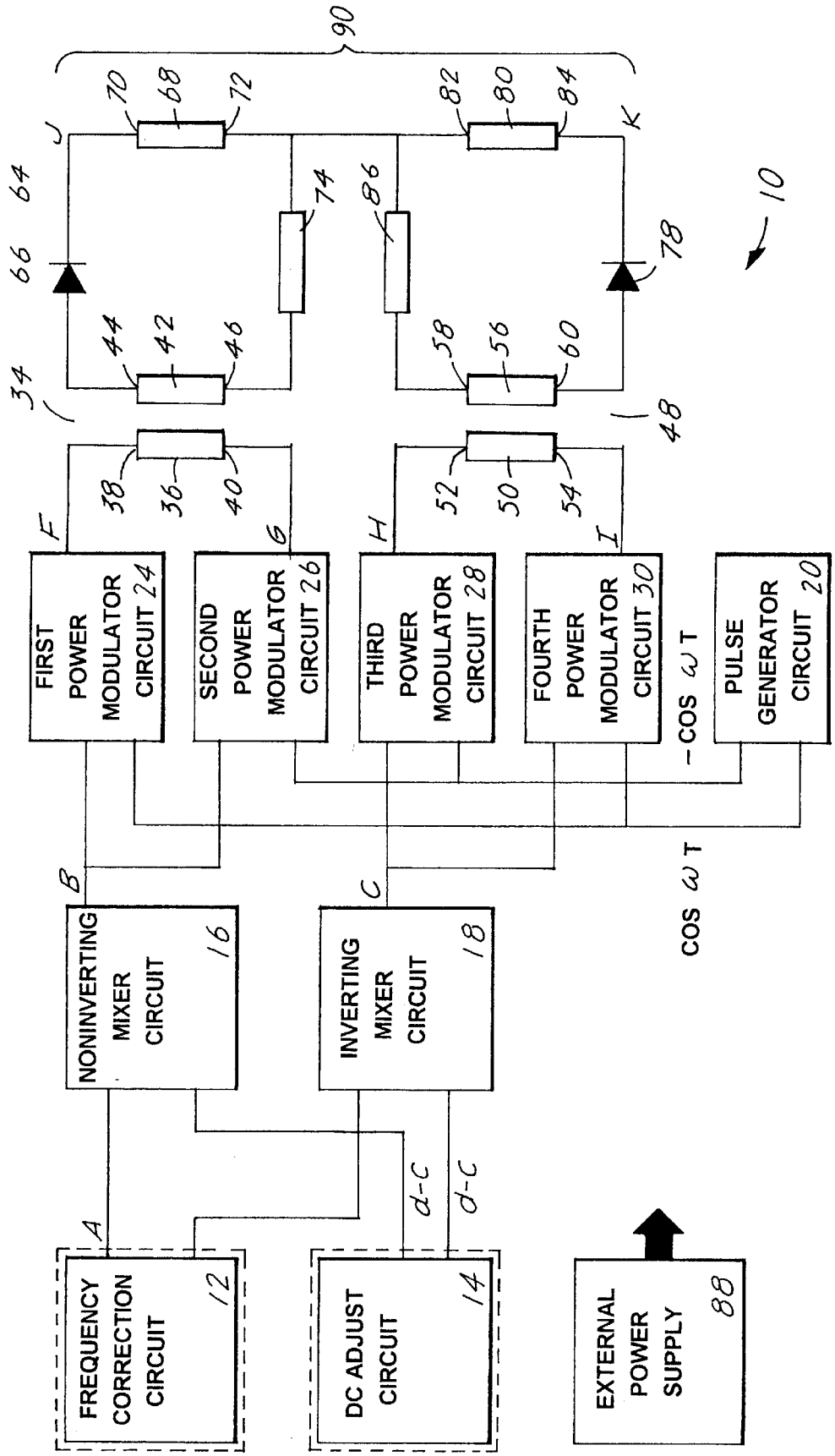
FIG. 2 is a block diagram of an electronic signal conditioner that operates a differential capacitive load by utilizing two transformers having push-pull primary windings.

The second of the four design configurations of the ESC 10, as shown in FIG. 2, also operates a differential capacitive load 90. As in the first design, the second design of the ESC 10 also commences to operate when a low-frequency a-c signal is applied to the input of the frequency correction circuit 12. The frequency correction circuit 12, as well as the d-c adjust circuit 14, the noninverting mixer circuit 16, the inverting mixer circuit 18 and the pulse generator circuit 20 function in a similar manner as described in the first design configuration. Therefore, their description and function are not repeated.

The second design differs from the first design in that four power modulator circuits are used, in lieu of two, to allow the differential capacitive load 90 to operate in a push-pull fashion.

The first power modulator circuit 24 has means for receiving the first mixed signal from the noninverting mixer circuit 16 and the phase modulating signal COS ωt from the pulse generator 20. The output of the first modulator circuit 24 is a first high-frequency signal as shown in FIG. 5F. This signal has an amplitude proportional to the first mixed signal and a phase corresponding to the phase modulating signal COS ωt.

The second power modulator circuit 26 has means for receiving the first mixed signal also from the noninverting mixer circuit 16 and the complementary phase modulating signal −COS ωt from the pulse generator circuit 20. The output from the second modulator circuit 26 is a second high-frequency signal as shown in FIG. 5G. This signal has an amplitude proportional to the first mixed signal and a phase corresponding to the complementary modulating signal −COS ωt.

The third power modulator circuit 28 has means for receiving the inverted second mixed signal from the inverting mixing circuit 18 and the complementary phase modulating signal −COS ωt from the pulse generator circuit 20. The output of the third modulator circuit 28 is a third high-frequency signal as shown in FIG. 5H. This signal has an amplitude proportional to the inverted second mixed signal and a phase corresponding to the complementary phase modulated signal −COS ωt.

The fourth and final power modulator circuit 30 has means for receiving the inverted second mixed signal and the direct phase modulating signal COS ωt. The output of the fourth power modulator circuit 30 is a fourth high-frequency signal as shown in FIG. 5I. This signal has an amplitude proportional to the inverted second mixed signal and a phase corresponding to the phase modulating signal COS ωt.

The second design configuration as shown in FIG. 2, is operated with a first high-frequency transformer 34 and a second high-frequency transformer 48. The first high-frequency transformer 34 has a primary winding 36 with a first end 38 and a second end 40. The first end 38 is connected to the first high-frequency signal and the second end 40 is connected to the second high-frequency signal. The secondary winding 42 has a first end 44 and a second end 46. From the secondary winding is produced a voltage having an amplitude which corresponds to the requirement of the differential capacitive load 90.

The second high-frequency transformer 48 also has a primary winding 50 with a first end 52 and a second end 54. The first end 52 is connected to the third high-frequency signal and the second end is connected to the fourth high-frequency signal. The secondary winding 56 has a first end 58 and a second end 60. From the secondary winding is produced a voltage having an amplitude which corresponds to the requirements of said differential capacitive load 90.

In series with the secondary winding 42 of the first high-frequency transformer 34 is connected the first rectifying circuit 64 and in series with the second winding 56 of the second high-frequency transformer 48 is connected the second rectifying circuit 76. The first and second rectifying circuits have been previously described in the description of the first design configuration.

As shown in FIG. 2, the first rectifying circuit 64 provides to the first load 68 a first mixed signal and d-c voltage as shown in FIG. 5J. The second rectifying circuit 76 provides to the second load 80 an output load signal as shown in FIG. 5K. From across the first side 70 of the first load 68 and the second side 84 of the second load 80 is connected the differential capacitive load 90.

Figure 3:
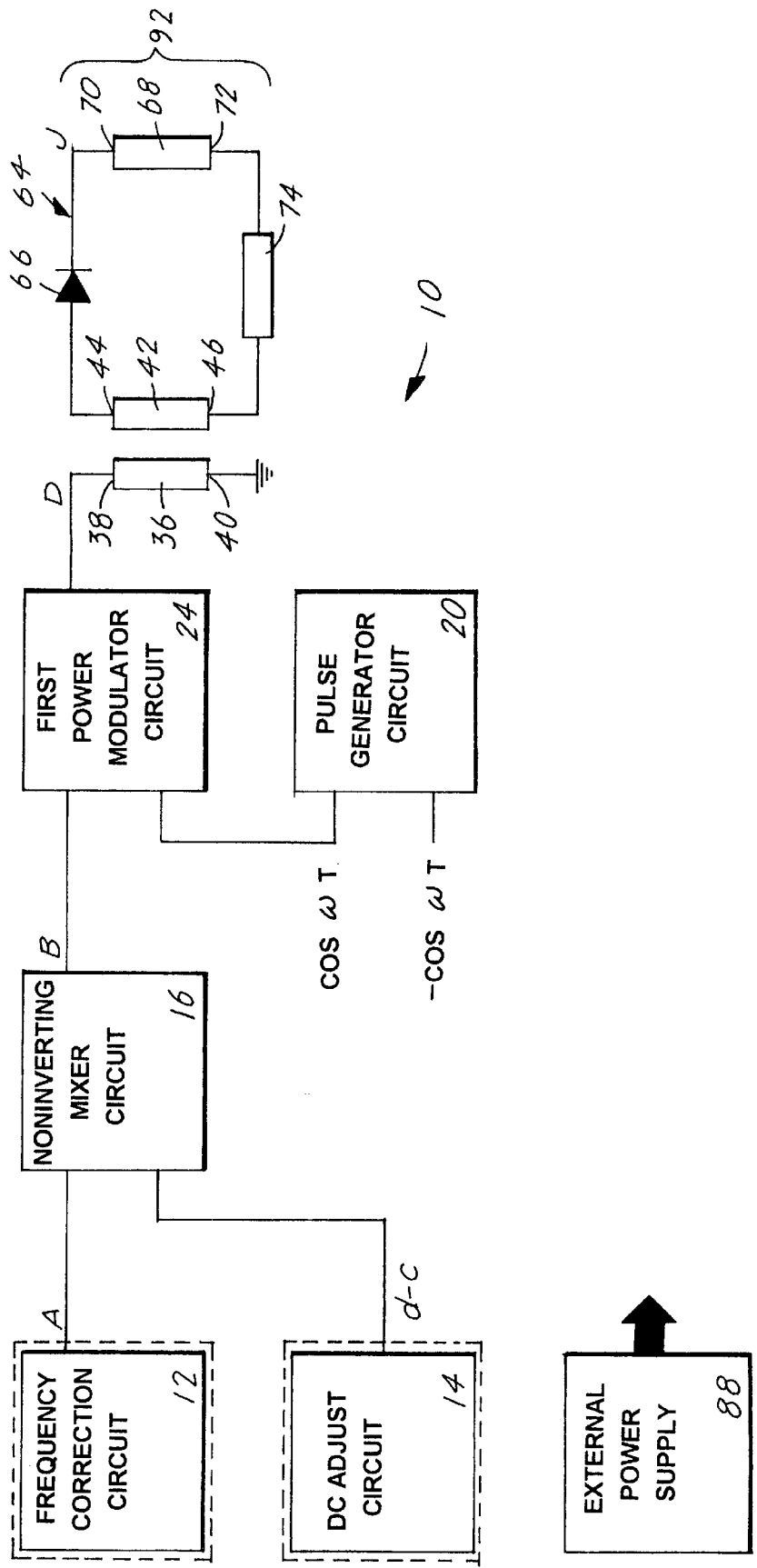
FIG. 3 is a block diagram of an electronic signal conditioner that operates a single-ended capacitive load by utilizing a single transformer having a single-ended primary winding.

The third design configuration of the electronic signal conditioner 10, as shown in FIG. 3, operates a single-ended capacitive load 92 that is connected across the first high-frequency transformer 34.

As in the first and second designs, the third design of the ESC 10 commences operation when a low frequency a-c signal is applied to the input of the frequency correction circuit 12. This circuit as well as the d-c adjust circuit 14, the noninverting mixer circuit 16 and the pulse generator circuit 20 function in a similar manner as described in the first and second design configurations and are therefore not described in detail again.

The first power modulator circuit 24 has means for receiving the mixed signal from the noninverting mixer circuit 16 and the phase modulating signal COS ωt from the pulse generator circuit 20. The output from the first modulator circuit 24 is a high-frequency signal as shown in FIG. 5D, which has an amplitude proportional to the mixed signal and d-c voltage and a phase corresponding to the phase modulating signal COS ωt.

The third design configuration is operated with a first high-frequency transformer 34 having a single-ended primary winding 36 with a first end 38 and a second end 40. The second end 40 is connected to circuit ground and the first end 38 is connected to the high-frequency signal. The secondary winding has a first end 44 and a second end 46. From the second winding 42 is produced a voltage having an amplitude which corresponds to the requirements of said single-ended capacitive load 92.

In series with the secondary winding 42 of the first high-frequency transformer 34 is connected a first rectifying circuit 68 as previously described. As shown in FIG. 3, the first rectifying circuit 64 provides to the first load 68 a first mixed signal and d-c voltage as shown in FIG. 5J. In this third design the single-ended capacitive load is taken across the first load 68.

Figure 4:
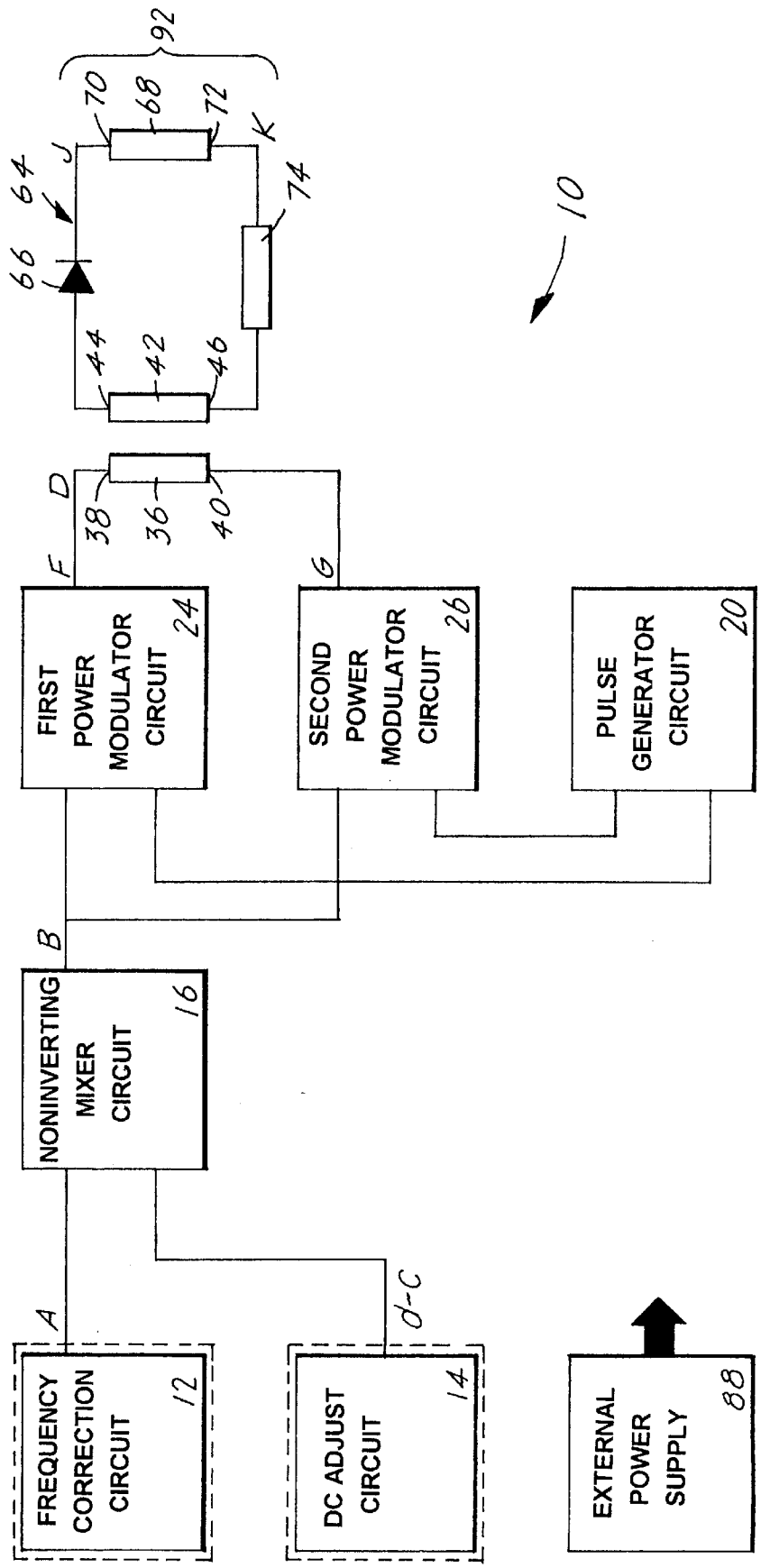
FIG. 4 is block diagram of an electronic signal conditioner that operates a single-ended capacitive load by utilizing a single transformer having a push-pull primary winding.
Figure 5:
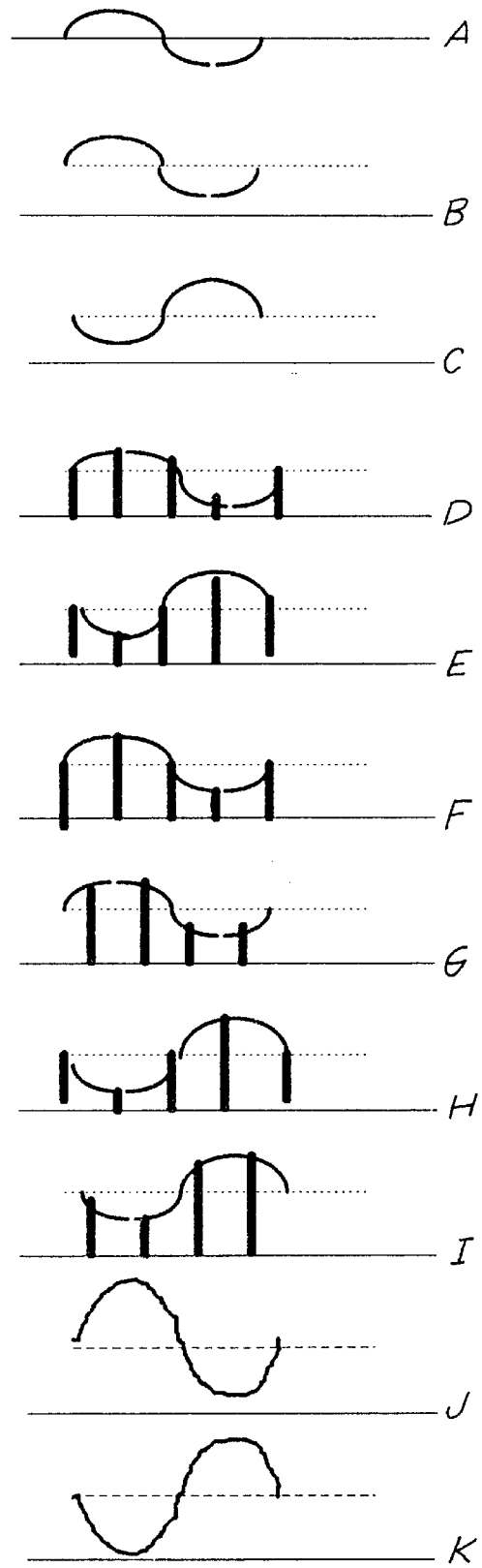
FIGS. 5A–5K is a compilation of waveforms that appear in critical points in the circuits of the electronic signal conditioner.

The fourth and final design configuration of the electronic signal conditioner 10, as shown in FIG. 4, operates a single-ended capacitive load that is operated in a push-pull fashion across the first high-frequency transformer 34.

As in the first, second and third designs, the fourth design of the electronic signal conditioner 10 commences operation when a low-frequency a-c signal is applied to the input of the frequency correction circuit 12. This circuit as well as the d-c adjust circuit 14, the noninverting mixer circuit 16, and the pulse generator circuit 20 function in a similar manner as previously described and therefore are not described.

The first power modulator circuit 24 has means for receiving the mixed signal and the phase modulating signal COS ωt. The output of the circuit 24 is a first high-frequency signal. This signal has an amplitude proportional to the mixed signal and a phase corresponding to the direct phase modulating signal COS ωt.

The second power modulator circuit 26 has means for receiving the mixed signal and d-c voltage and the complementary phase modulating signal −COS ωt. The output of the circuit 26 is a second high-frequency signal. This signal has an amplitude proportional to the mixed signal and d-c voltage and a phase corresponding to the complementary phase modulating signal −COS ωt.

The first high-frequency transformer 34 operates with a primary winding 36 having a first end 38 and a second end 40. As shown in FIG. 4, the first end 38 is connected to the first high-frequency signal from the first power modulator circuit 24 and the second end 40 is connected to the second high-frequency signal from the second power modulator circuit 26. The secondary winding 42 has a first end 44 and a second end 46. From the secondary winding is produced a voltage having an amplitude which corresponds to the requirement of the single-ended capacitive load 92.

In series with the secondary winding 42 of the first high-frequency transformer 34 is connected a first rectifying circuit 64 as previously described. As shown in FIG. 4, the first rectifying circuit 64 produces an output load signal, as shown in FIG. 5J, that is applied across the first load 68 to which is connected the single-ended capacitive load 68.

While the invention has been described in complete detail and pictorially shown in the accompanying drawings it is not to be limited to such details, since many changes and modifications may be made in the invention without departing from the spirit and scope thereof. For example, the ECS 10, in its most basic design, can be operated without the frequency correction circuit 12 and the d-c adjust circuit 14. When these circuits are not used, the low frequency input signal and the d-c voltage, derived in this design configuration from the external power supply, are applied directly to the noninverting mixer circuit 16 and the inverting mixer circuit 18 as shown in FIGS. 1 and 2 or only to the noninverting mixer circuit 16 as shown in FIGS. 3 and 4. The exclusion of the frequency correction circuit 12 and the d-c adjust 14 is depicted by the broken lines around these circuits. Hence, the ECS 10 is described to cover any and all modifications and forms which may come within the language and scope of the appended claims.

I claim:

1. An electronic signal conditioner having an output connected to a differential capacitive load, said electronic signal conditioner comprising:
   a) a frequency correction circuit having means for receiving an input signal and producing a first a-c signal and a second a-c signal,
   b) a d-c adjust circuit having means for adjusting the amplitude of a first d-c voltage and a second d-c voltage, wherein said voltages are utilized as a d-c bias voltage,
   c) a noninverting mixer circuit having means for receiving the first a-c signal and the first d-c voltage, wherein said noninverting mixer circuit adds the first a-c signal to the first d-c voltage to produce a first mixed signal,
   d) an inverting mixer circuit having means for receiving the second a-c signal and the second d-c voltage, wherein said inverting mixer circuit adds the second a-c signal to the the second d-c voltage to produce an inverted second mixed signal,
   e) a pulse generator circuit having means for producing a direct phase modulating signal COS ωt,
   f) a first power modulator circuit having means for receiving the first mixed signal, the phase modulating signal COS ωt and producing a first high-frequency signal which has an amplitude proportional to the first mixed signal and a phase corresponding to the phase modulating signal COS ωt,
   g) a second power modulator circuit having means for receiving the inverted second mixed signal and the direct phase modulating signal COS ωt and producing a second high-frequency signal which has an amplitude proportional to the second mixed signal and a phase corresponding to the phase modulating signal COS ωt,
   h) a first high-frequency transformer having a single-ended primary winding with a first end and a second end, wherein the second end is connected to circuit ground and the first end is connected to the first high-frequency signal; and a secondary winding having a first end and a second end, wherein from the secondary winding is produced a voltage having an amplitude which corresponds to the requirement of said differential capacitive load,
   i) a second high-frequency transformer having a single-ended primary winding with a first end and a second end, wherein the second end is connected to circuit ground and the first end is connected to the second high-frequency signal; and a secondary winding having a first end and a second end, wherein from the secondary winding is produced a voltage having an amplitude which corresponds to the requirements of said differential capacitive load,
   j) a first rectifying circuit comprising a first diode having an anode connected to the first end of the secondary winding of said first high-frequency transformer and a cathode connected to a first side of a first load, also having a second side that is connected through a first current limiting impedance to the second end of the secondary winding, wherein said first rectifying circuit produces an output load signal that is applied to the first load,
   k) a second rectifying circuit comprising a second diode having an anode connected to the second end of the secondary winding of said second high-frequency transformer and a cathode connected to a second side of a second load, also having a first side that is connected through a second current limiting impedance to the first end of the secondary winding, wherein said second rectifying circuit produces an output load signal that is applied to the second load, wherein the second side of the first load and the first side of the second load are connected together and wherein from across the first side of the first load and the second side of the second load is connected said differential capacitive load, and
   l) a power supply having means for supplying the required power levels to operate the circuits comprising said electronic signal conditioner.

2. An electronic signal conditioner having an output connected to a differential capacitive load, said electronic signal conditioner comprising:
   a) a frequency correction circuit having means for receiving an input signal and producing a first a-c signal and a second a-c signal which compensate for the frequency and power nonlinearities of said differential capacitive load,
   b) a d-c adjust circuit having means for producing an adjustable first d-c voltage and a second d-c voltage, wherein said voltages are commensurate with the specific load characteristics of said differential capacitive load,
   c) a noninverting mixer circuit having means for receiving the first a-c signal and the first d-c voltage, wherein said noninverting mixer circuit adds the first a-c signal to the first d-c voltage to produce a first mixed signal,
   d) an inverting mixer circuit having means for receiving the second a-c signal and the second d-c voltage, wherein said inverting mixer circuit adds the second a-c signal to the d-c voltage to produce an inverted second mixed signal,

9 e) a pulse generator circuit having means for producing a phase modulating signal COS ωt, and a complementary phase modulating signal −COS ωt, f) a first power modulator circuit having means for receiving the first mixed signal and the phase modulating signal COS ωt, and producing a first high-frequency signal which has an amplitude proportional to the first mixed signal and a phase corresponding to the phase modulating signal COS ωt, g) a second power modulator circuit having means for receiving the first mixed signal signal and the complementary phase modulating signal −COS ωt and producing a second high-frequency signal which has an amplitude proportional to the first mixed signal and a phase corresponding to the complementary phase modulating signal −COS ωt, h) a third power modulator circuit having means for receiving the inverted second mixed signal and the complementary phase modulating signal −COS ωt, and producing a third high-frequency signal which has an amplitude proportional to the inverted second mixed signal and a phase corresponding to the complementary phase modulated signal −COS ωt, i) a fourth power modulator circuit having means for receiving the inverted second mixed signal and the phase modulating signal COS ωt, and producing a fourth high-frequency signal which has an amplitude proportional to the inverted second mixed signal and a phase corresponding to the phase modulating signal COS ωt, j) a first high-frequency transformer having a primary winding with a first end and a second end, wherein the first end is connected to the first high-frequency signal and the second end is connected to the second high-frequency signal; and a secondary winding having a first end and a second end, wherein from the secondary winding is produced a voltage having an amplitude which corresponds to the requirement of said differential capacitive load, k) a second high-frequency transformer having a primary winding with a first end and a second end, wherein the first end is connected to the third high-frequency signal and the second end is connected to the fourth high-frequency signal; and a secondary winding having a first end and a second end, wherein from the secondary winding is produced a voltage having an amplitude which corresponds to the requirements of said differential capacitive load, l) a first rectifying circuit comprising a first diode having an anode connected to the first end of the secondary winding of said first high-frequency transformer and a cathode connected to a first side of a first load, also having a second side that is connected through a first current limiting impedance to the second end of the secondary winding, wherein said first rectifying circuit produces an output load signal that is applied to the first load, m) a second rectifying circuit comprising a second diode having an anode connected to the second end of the secondary winding of said second high-frequency transformer and a cathode connected to a second side of a second load, also having a first side that is connected through a second current limiting impedance to the first end of the secondary winding, wherein said second rectifying circuit produces an output load signal that is applied to the second load, wherein the second side of

10 the first load and the first side of the second load are connected together and wherein from across the first side of the first load and the second side of the second load is connected said differential capacitive load, and n) a power supply having means for supplying the required power levels to operate the circuits comprising said electronic signal conditioner.

3. An electronic signal conditioner having an output connected to a single-ended capacitive load, said electronic signal conditioner comprising:

a) a frequency correction circuit having means for receiving an input signal and producing an a-c signal which compensates for the frequency and power nonlinearities of said single-ended capacitive load, b) a d-c adjust circuit having means for producing an adjustable d-c voltage, wherein said voltage is commensurate with the specific load characteristics of said single-ended capacitive load, c) a noninverting mixer circuit having means for receiving the a-c signal and the d-c voltage, wherein said mixer circuit adds the a-c signal to the d-c voltage to produce a mixed signal, d) a pulse generator circuit having means for producing a phase modulating signal COS ωt, e) a first power modulator circuit having means for receiving the mixed signal and the phase modulating signal COS ωt and producing a high-frequency signal which has an amplitude proportional to the mixed signal, and a phase corresponding to the phase modulating signal COS ωt, f) a first high-frequency transformer having a single-ended primary winding with a first end and a second end, wherein the second end is connected to circuit ground and the first end is connected to the high-frequency signal; and a secondary winding having a first end and a second end, wherein from the secondary winding is produced a voltage having an amplitude which corresponds to the requirement of said single-ended capacitive load, g) a first rectifying circuit comprising a first diode having an anode connected to the first end of the secondary winding of said first high-frequency transformer and a cathode connected to a first side of a first load, also having a second side that is connected through a first current limiting impedance to the second end of the secondary winding, wherein said first rectifying circuit produces an output load signal that is applied across the first load to which is connected said single-ended capacitive load, and h) a power supply having means for supplying the required power levels to the circuits comprising said electronic signal conditioner.

4. An electronic signal conditioner having an output connected to a single-ended capacitive load, said electronic signal conditioner comprising:

a) a frequency correction circuit having means for receiving an input signal and producing an a-c signal, which compensates for the frequency and power nonlinearities of said single-ended capacitive load, b) a d-c adjust circuit having means for producing an adjustable d-c voltage, wherein said voltage is commensurate with the specific load characteristics of said single-ended capacitive load, c) a noninverting mixer circuit having means for receiving the a-c signal and the d-c voltage, wherein said direct mixer circuit adds the a-c signal to the d-c voltage to produce a mixed signal, d) a pulse generator circuit having means for producing a phase modulating signal COS ωt, and a complementary phase modulating signal −COS ωt, e) a first power modulator circuit having means for receiving the mixed signal and d-c voltage and the phase modulating signal COS ωt and producing a first high-frequency signal which has an amplitude proportional to the mixed signal and a phase corresponding to the phase modulating signal COS ωt, f) a second power modulator circuit having means for receiving the mixed signal and the complementary phase modulating signal −COS ωt and producing a second high-frequency signal which has an amplitude proportional to the mixed signal and a phase corresponding to the complementary phase modulating signal −COS ωt, g) a first high-frequency transformer having a primary winding with a first end and a second end, wherein the first end is connected to the first high-frequency signal and the second end is connected to the second high-frequency signal; and a secondary winding having a first end and a second end, wherein from the secondary winding is produced a voltage having an amplitude which corresponds to the requirement of said single-ended capacitive load, h) a first rectifying circuit comprising a first diode having an anode connected to the first end of the secondary winding of said first high-frequency transformer and a cathode connected to a first side of a first load, also having a second side that is connected through a first current limiting impedance to the second end of the secondary winding, wherein said first rectifying circuit produces an output load signal that is applied across the first load to which is connected said single-ended capacitive load, and i) a power supply having means for supplying the required power levels to the circuits comprising said electronic signal conditioner.

* * * * *